United States Patent
Sprogis et al.

(10) Patent No.: US 10,163,178 B1
(45) Date of Patent: Dec. 25, 2018

(54) MULTI-BEAM PHASED ARRAY ANTENNA FOR TRANSIT ACCESS

(71) Applicant: Cubic Corporation, San Diego, CA (US)

(72) Inventors: Robert Sprogis, Wake Forest, NC (US); Kay Paetzold, Hamburg (DE); Thomas Busch-Sorensen, San Diego, CA (US); Tareef Al-Mahdawi, Escondido, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/950,025

(22) Filed: Apr. 10, 2018

Related U.S. Application Data

(60) Provisional application No. 62/524,713, filed on Jun. 26, 2017.

(51) Int. Cl.

| | |
|---|---|
| *G06Q 50/30* | (2012.01) |
| *H01Q 21/29* | (2006.01) |
| *H04B 17/318* | (2015.01) |
| *H04W 4/02* | (2018.01) |
| *H04W 4/80* | (2018.01) |

(52) U.S. Cl.
CPC ............ *G06Q 50/30* (2013.01); *H01Q 21/29* (2013.01); *H04B 17/318* (2015.01); *H04W 4/02* (2013.01); *G06Q 2240/00* (2013.01); *H04W 4/80* (2018.02)

(58) Field of Classification Search
None
See application file for complete search history.

(56) References Cited

U.S. PATENT DOCUMENTS

2018/0144563 A1* 5/2018 Reymann ........... G07C 9/00031

FOREIGN PATENT DOCUMENTS

| WO | 2016-205617 A1 | 12/2016 |
|---|---|---|
| WO | 2016/205817 A1 | 12/2016 |
| WO | 2017/027369 A1 | 2/2017 |
| WO | 2017-027369 A1 | 2/2017 |

OTHER PUBLICATIONS

International Search Report and Written Opinion dated Jul. 27, 2018, PCT/US2018/027132, all pages.
International Search Report and Written Opinion dated Jul. 27, 2018 in related application PCT/US2018/027132, all pages.

* cited by examiner

*Primary Examiner* — Kristy A Haupt
(74) *Attorney, Agent, or Firm* — Kilpatrick Townsend & Stockton

(57) ABSTRACT

System, device, and method for enabling transit access using a multi-beam phased array antenna. One method may include repeatedly transmitting, by a location transmitter positioned within a transit location within a transit system, a location signal identifying the transit location. The method may include receiving, by a mobile communication device, the location signal, initiating a check-in process, and transmitting a device signal identifying the mobile communication device. The method may include receiving, by a gate receiver positioned within a gate within the transit location, the device signal and analyzing the received device signal to determine that a holder of the mobile communication device is entering through the gate.

20 Claims, 13 Drawing Sheets

MULTI-BEAM PHASED ARRAY ANTENNA FOR TRANSIT ACCESS

CROSS-REFERENCES TO RELATED APPLICATIONS

This Application claims priority to U.S. Provisional Patent Application No. 62/524,713 filed Jun. 26, 2017, titled "WIRELESS TRANSIT TICKETING," the entire disclosure of which is hereby incorporated by reference, for all purposes, as if fully set forth herein.

BACKGROUND OF THE INVENTION

As populations in the world's largest city centers continue to grow, often at an exponential rate, public and private transportation systems are becoming increasingly burdened with increased ridership and transit stations are becoming increasingly congested, causing delays to transit users and increased costs to the transportation systems. The use of sophisticated mobile communication devices presents an appealing approach for managing such overcrowding. Unfortunately, existing devices and approaches are insufficient to alleviate these problems. Accordingly, new systems, methods, and other techniques are needed.

BRIEF SUMMARY OF THE INVENTION

In a first aspect of the present invention, a method of using a multi-beam phased array antenna for enabling transit access is provided. The method may include repeatedly transmitting, by a location transmitter positioned within a transit location within a transit system, a location signal identifying the transit location. The method may also include receiving, by a mobile communication device, the location signal. The method may further include in response to receiving the location signal, initiating, by the mobile communication device, a check-in process and transmitting, by the mobile communication device, a device signal identifying the mobile communication device. The method may include receiving, by a gate receiver positioned within a gate within the transit location, the device signal. In some embodiments, the gate receiver includes the multi-beam phased array antenna. The method may also include analyzing, by the gate receiver, at least two received signal strength indicators (RSSI) corresponding to the received device signal to determine that a holder of the mobile communication device is entering through the gate. The method may further include causing, by the mobile communication device, a completion of the check-in process.

In some embodiments, the multi-beam phased array antenna includes a plurality of antenna elements arranged in a side-by-side configuration. In some embodiments, the multi-beam phased array antenna includes at least two beam forming networks coupled to the plurality of antenna elements configured to produce at least two fan beams pointing in at least two directions. In some embodiments, the gate receiver includes at least two decoders coupled to the at least two beam forming networks for generating the at least two RSSIs.

In a second aspect of the present invention, a method of using wireless radio-frequency (RF) signals for enabling transit access is provided. The method may include receiving, by a mobile communication device from a location transmitter positioned within a transit location within a transit system, a location signal identifying the transit location. In some embodiments, the location signal is repeatedly transmitted by the location transmitter. The method may also include in response to receiving the location signal, initiating, by the mobile communication device, a check-in process repeatedly transmitting, by the mobile communication device, a device signal identifying the mobile communication device. The method may further include causing a completion of the check-in process in response to the device signal being received by a gate receiver. In some embodiments, the gate receiver is positioned within a gate within the transit location. In some embodiments, the received device signal is analyzed to determined that a holder of the mobile communication device is entering through the gate.

In some embodiments, the location transmitter includes an omni-directional antenna. In some embodiments, the gate receiver includes a multi-beam phased array antenna. In some embodiments, the multi-beam phased array antenna includes a plurality of antenna elements arranged in a side-by-side configuration. In some embodiments, the multi-beam phased array antenna includes at least two beam forming networks coupled to the plurality of antenna elements configured to produce at least two fan beams pointing in at least two directions. In some embodiments, the gate receiver includes at least two decoders coupled to the at least two beam forming networks for generating at least two received signal-strength indicators (RSSI) corresponding to the received device signal.

In some embodiments, analyzing the received device signal to determine that the holder of the mobile communication device is entering through the gate includes determining that a first maximum of a first RSSI of the at least two RSSIs is greater than a predetermined threshold, determining that a second maximum of a second RSSI of the at least two RSSIs is greater than the predetermined threshold, and determining whether a first time associated with the first maximum is greater or less than a second time associated with the second maximum. In some embodiments, initiating, by the mobile communication device, the check-in process includes opening an application associated with the transit access on the mobile communication device. In some embodiments, initiating, by the mobile communication device, the check-in process includes holding an amount as unavailable on an account associated with the mobile communication device.

In some embodiments, transmitting the device signal identifying the mobile communication device includes repeatedly transmitting the device signal identifying the mobile communication device. In some embodiments, causing the completion of the check-in process includes causing the mobile communication device to stop transmitting the device signal and repeatedly receiving, by the mobile communication device, the location signal. In some embodiments, communication between the location transmitter, the mobile communication device, and the gate receiver utilizes Bluetooth Low Energy (BLE).

In a third aspect of the present invention, a gate receiver for enabling transit access using wireless RF signals is provided. The gate receiver may include an antenna. The gate receiver may also include one or more processors communicatively coupled to the antenna. In some embodiments, the one or more processors are configured to perform operations including receiving, using the antenna, a device signal identifying a mobile communication device. In some embodiments, the device signal is repeatedly transmitted by the mobile communication device in response to the mobile communication device receiving a location signal from a location transmitter positioned within a transit location within a transit system. In some embodiments, the location signal identifies the transit location and is repeatedly transmitted by the location transmitter. In some embodiments, the mobile communication device initiates a check-in process in response to receiving the location signal. The operations may also include analyzing the received device signal to determine that a holder of the mobile communication device is entering through a gate including the gate receiver. The operations may further include causing a completion of the check-in process.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
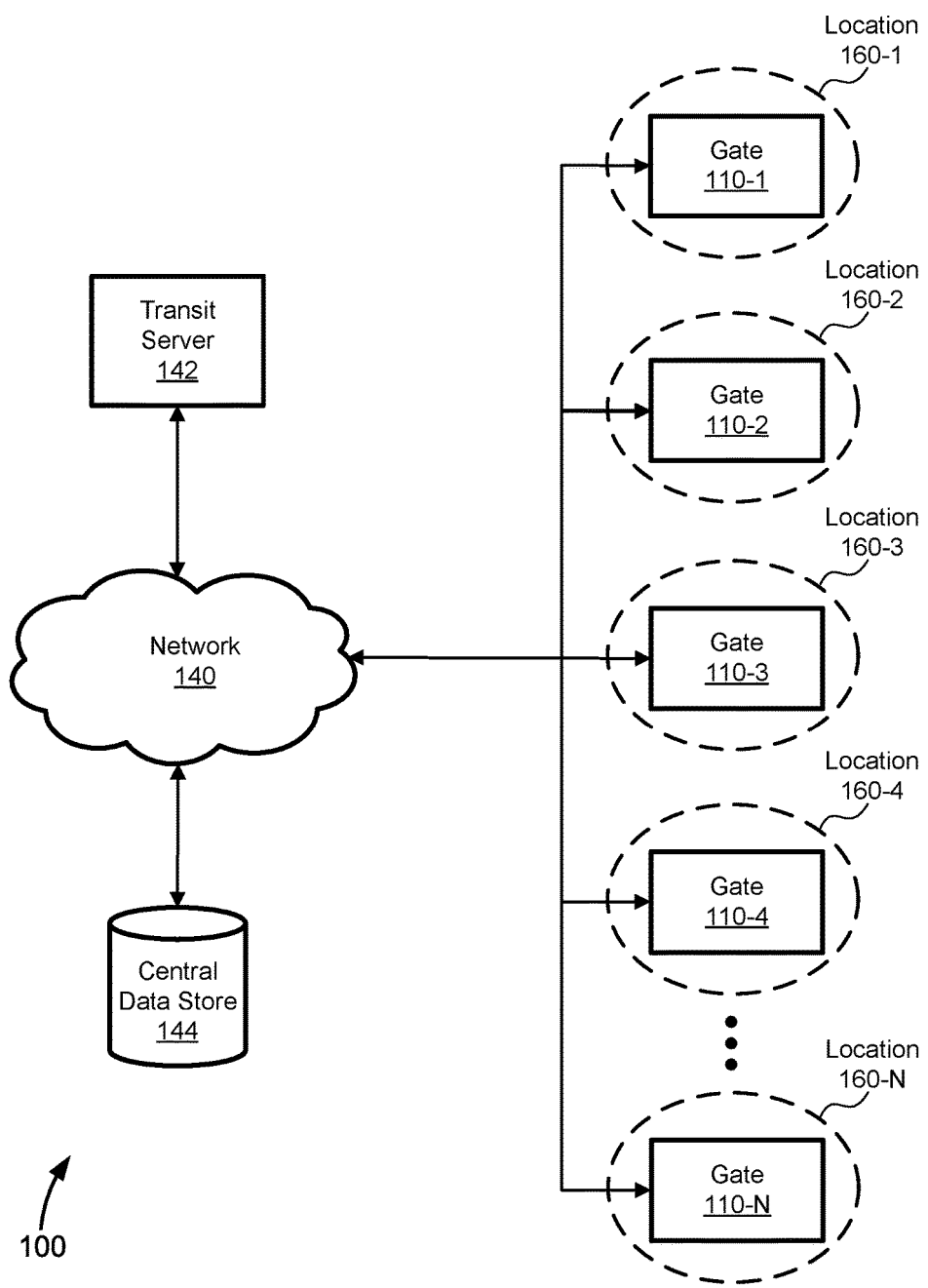
FIG. 1 illustrates a block diagram of a transit system 100, according to some embodiments of the present disclosure.

In the appended figures, similar components and/or features may have the same numerical reference label. Further, various components of the same type may be distinguished by following the reference label by a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Systems, methods, and techniques are provided in the present disclosure for enabling transit access using wireless radio-frequency (RF) signals. In some embodiments, Bluetooth low energy (BLE) devices are utilized as "beacons", i.e., devices that transmit a signal continuously without needing a reply. Such beacons may use omnidirectional antennas and may be used for positioning of mobile communication devices such as mobile phones. Positioning of a wireless device using BLE beacons, however, is often limited to a very rough estimate of the device's position. This is due in part to the non-uniform and orientation-dependent emission pattern exhibited by many wireless devices. Additionally, reflections from metal objects and attenuation from human bodies make it difficult to pinpoint the position of a wireless device. As such, the utilization of BLE beacons in transit applications traditionally have not been able to accurately determine whether a transit user carrying a wireless device has entered or exited a transit system (passing through a gate, turnstile, and/or other point of entry/exit of the transit station, vehicle, etc.).

Some of the embodiments described herein solve these and other issues by utilizing, among other things, BLE receivers with directional antennas in combination with a confined space, such as a gate aisle or an entrance to a bus. This combination can define one or more "volumes" of space in which a wireless device may be assumed to be within, if a threshold received signal strength indicator (RSSI) is reached. These "volumes" may further be utilized with traditional omnidirectional BLE beacons to enable a transit user to wirelessly "check-in" and "check-out" of transit vehicles, stations, and/or other parts of a transit system. According to some embodiments, the transit user may not even need to interact with the wireless device used to check-in/out, but this process may be done automatically.

According to some embodiments, multiple directional antennas can be integrated in one unit by using multiple elements and phased array techniques. It may be preferable to have the directional antennas operate as receivers as all directions can be monitored simultaneously. Due to the high signal strength of a BLE source, such as a mobile phone, combined with the limited range needed, the phased array need not be designed for maximum sensitivity. Accordingly, simple and inexpensive resistor networks can be used for the beamforming circuits in combination with (lossy) striplines for the delays. According to some embodiments, the striplines can be integrated into a PCB antenna using copper patches for elements or ceramic patch antennas.

As an example, an antenna configuration may comprise a single phased array antenna mounted to the side of the gate cabinet, facing the aisle at the entry point. The directional beams can cover the entry point to the gate and a number of positions inside the gate. By comparing the RSSI from each beam with the mean value from all beams and also considering the absolute value of the RSSI, it can be determined that a transit user is entering the aisle or is inside it. It would be advantageous to monitor the RSSI over time since the RSSI will follow a certain pattern as a transit user moves through the aisle. In another embodiment, there can be an antenna array on both sides of the gate aisle to improve the positioning and also to make the system less susceptible to attenuation of the RF signal by the human body. In some embodiments, four antenna arrays could be utilized with two covering an entry side of an aisle and two covering an exit side. In some embodiments, an antenna array could be mounted in a (raised) floor in the aisle or in the ceiling (or a structure above the gates).

By using the antenna arrays for receiving only, there is no limit to how many arrays can be used, since there is no interference between them. In some embodiments, the walls in the gate aisle could be covered by material that attenuates the RF signal. If the gate cabinet is partly made of RF transparent material such as glass, the glass could be coated by a thin metal film to block any RF signal from neighboring aisles. Mounting of the antennas may not be limited to the gate cabinet. In some cases it would be an advantage to have the antennas mounted on the moving barriers of the gate. The connection to these antennas could be through flexible cables or an RF link.

In some embodiments, additional sensors may be utilized with the directional BLE receivers to help ensure the accuracy of a determination that a transit user has checked in to the transit system. For example, in addition to directional BLE receivers, a gate (or other access point of the transit system) may also include one or more cameras, optical sensors (e.g., infrared sensors), and/or other sensors to help detect passage of a transit user through the gate. Information from these additional sensors may be fused with information regarding detection of signals to or from the directional BLE receivers to determine whether a check-in event has occurred (i.e., that a user has checked into a transit vehicle or other part of the transit system).

As previously mentioned, these directional BLE receivers may be utilized as part of a larger system that may enable transit users to automatically check-in and/or check-out of certain parts of a transit system. For example, embodiments of such a larger system may comprise one or more directional BLE receivers creating a "volume" at an entrance of a bus, allowing for detection of entrance onto the bus by a transit user with a Bluetooth-enabled mobile phone. An omnidirectional BLE beacon may also be used to determine when a transit user exits the bus (e.g., by determining when a mobile phone of the transit user is out of range of beacons sent by the omnidirectional BLE beacon). Thus, in these embodiments, the directional BLE receivers and omnidirectional BLE beacon can be respectively referred to as the check-in beacons and the check-out beacon.

The functionality of the check-in and check-out beacons may vary, depending on desired functionality. For example, in some embodiments, the beacons may simply transmit a unique identifier, enabling a wireless device (e.g. mobile phone) of the transit user to determine when the transit user has checked in and checked out of the transit system. In such embodiments, the wireless device may execute an application to enable the wireless device to detect check-in and check-out beacons and send communications to a transit server to allow the transit server to determine how to charge an account of the transit user based on the transit users usage of the transit system.

In some embodiments, when a transit user carrying a mobile phone with Bluetooth capabilities comes within a certain proximity of a bus, the mobile phone may detect signals from the check-out (omni-directional) BLE beacon located on a bus (which may be detectable outside of the bus). In some embodiments, the detected signals may include a payload with the location and/or identifier of the BLE beacon. Upon detection, this may alert an application executed by the mobile phone that the bus is nearby. In turn, the application may cause the mobile phone to initiate a check-in process (or enter a check-in state) in which the mobile phone may increase a rate at which it detects beacons and/or communicates via BLE. In some embodiments, a separate BLE beacon with a smaller detection region may be located at or near the entrance of the bus, to help ensure that the phone is closer to the entrance of the bus before entering the check-in state. In any case, because it may take a few seconds for the phone to enter the check-in state, the transit system may be configured to ensure that the phone detects signals from a beacon (or otherwise detect proximity to the bus) at least a few seconds in advance of entering the bus. In some embodiments, the mobile phone may enter the check-in state without any user interaction. In other embodiments, the mobile phone may prompt the user (e.g. via a graphical user interface on a display) to provide input before entering the check-in state. As the user enters the bus, the transit user and mobile phone pass through a "volume" at the bus entrance in which signals from check-in (directional) beacons are detected. These signals may include information packets with identification and/or other information enabling the application on the mobile phone to identify which bus the transit user has entered. The mobile phone may then relay this information wirelessly (e.g., via the Internet using cellular or other connectivity) to a transit server.

Depending on the desired functionality, the check-in beacons may transmit signals comprising information identifying the signal as a signal from the check-in beacons. Otherwise, the transit server may identify the detected signal as a signal from the check-in beacons using, for example, a database, lookup table, etc. In some embodiments, the mobile phone may not relay this information unless signals from both check-in and check-out beacons of the bus are detected, to help ensure that the mobile phone (and transit user) have indeed entered the bus. Alternatively or additionally, the mobile phone passes information to the transit server and the transit server may not register the check-in event unless it receives an indication that the mobile phone has detected signals from both check-in and check-out beacons. The transit server can then register a check-in event, tracking the transit user's use of the transit system by acknowledging that the transit user has entered that specific bus. In some embodiments, the transit server may then respond to the mobile phone by verifying that the mobile phone has properly checked into the bus and providing proof of check-in (e.g., in the form of a unique numerical code, picture, bar or QR code, etc.) which can be shown to an inspector by the transit user, if needed. When the transit user exits the bus and signals from the check-out beacon are no longer detectable by the mobile phone (e.g., the mobile phone is no longer close enough to the bus to detect the signals from the check-out beacon), the mobile phone may send information indicative of this to the transit server, and the transit server may register a check-out event and charge an account associated with the mobile phone (or transit user) for use of the transit system.

Here, the determination of a check-out event may vary, depending on the desired functionality. In some embodiments, for example, a mobile phone may detect signals periodically sent from the check-out beacon and, for each detected signal, transmit information to the transit server indicating the signal has been detected. When signals are no longer detected, the transit server can determine that a check-out event has occurred. Alternatively, the mobile phone may detect the signals from the check-out beacon and indicate to the transit server when the signals are no longer detected. In some embodiments, a threshold number of undetected signals may be determined before a check-out event is registered. That is, because various factors may cause a mobile phone to fail to detect every signal transmitted by the check-out beacon, the mobile phone or transit server may not determine that a check-out event has occurred until it determines that a threshold number of signals have not been detected (e.g., 3 signals in a row) or that the signals have not been detected for a threshold amount of time (e.g., 30 seconds).

Alternatively, some embodiments may utilize check-in and check-out beacons that are capable of bi-directional communication with the transit user's wireless device. In such embodiments, check-in and check-out beacons can respectively register check-in and check-out events by sending information to the transit server indicative of when a wireless device checks in and checks out a part of the transit system. Such information can include, for example, an identifier of the wireless device, a timestamp of the event (check-in or check-out), a location of the event, and/or similar information. Here, the server may be located on a transit vehicle or in a transit station (in which case the transit system may have a plurality of such servers), and/or the server may comprise a centralized server handling all check-in/check-out events of the transit system. In some embodiments, when a wireless device first detects a signal from a check-out (omni-directional) beacon and initiates a check-process (i.e., enters a check-in state), the wireless device can pair with the beacon or another BLE module and start transmitting advertising packets based on unique data from the transit server or the BLE module with which it is paired.

The functionality of the wireless device during a check-in state may vary, depending on the desired functionality. As noted above, when the wireless device determines that it is in within a certain proximity of a bus (or other part of the transit system to which check-in and check-out events apply), it may enter a check-in state. This determination may be made based on the detection of a signal from an omni-directional beacon associated with the bus. During the check-in state, the wireless device may begin transmitting advertising packets at a certain rate. In some embodiments, for example, this rate may be 10 times per second. Other embodiments may include other rates. The frequency of these rates may be set fast enough to help ensure that positioning accuracy while balancing power usage and RF crowding. The directionality of the signals sent by the check-in beacons can also help with keeping the number of BLE signals low. According to some embodiments, each BLE advertising packet may last at least 128 µs. According to some embodiments, there may be a short, random delay between the transmission of the advertising packets to help reduce the risk of continuous interference between two phones. The wireless device can continue transmitting advertising packets until (1) it receives an indication (e.g., from the transit server or directly from the check-in beacons) that a check-in event has been detected or registered, or (2) until a threshold amount time has passed. Alternatively, the check-in beacons may transmit sequenced signals. However in this case the wireless device might only give an update on RSSI every 1-2 seconds and it could take longer to start the reporting of RSSI in the first place.

Such embodiments may be utilized in gated and/or gateless environments, the former having movable barriers of entry, and the latter having none. In gated environments, directional BLE receivers may be disposed at or near gates of the transit system, enabling a transit user to check-in to the transit system upon passing through the gate (which may remove a physical barrier blocking entry into the transit system upon determining the transit user has checked in). Similarly, in a gateless environment, the directional BLE receivers may be disposed at or near entry points of the transit system, enabling a transit user to check-in to the transit system upon passing through the entry point.

Some embodiments may implement functionality to help reduce "spoofing"-type fraud. For example, in some embodiments, beacons and wireless devices may engage in pairing (if feasibly fast enough, given the type of usage), to help ensure that a single, unique check-in or check-out event occurs. In some embodiments, BLE beacons and/or wireless devices may transmit encrypted data having a keycode that changes (e.g., according to a timestamp, a predefined "rolling" pattern, etc.), reducing the chances that the signal may be successfully "spoofed" at some subsequent point in time.

FIG. 1 illustrates a block diagram of a transit system 100, according to some embodiments of the present disclosure. Transit system 100 may include a plurality of gates 110 located at a plurality of locations 160 (also referred to herein as transit locations 160). Each of locations 160 may include a non-restricted access area and a restricted access area. The non-restricted access area may include areas that are freely accessible to the general public, whereas the restricted access area may be reserved exclusively for customers of transit system 100. Examples of a restricted access area may include: the inside of a bus or train, a bus or train platform, the inside of a bus or train station, and the like. Each of locations 160 may include a single or multiple gates 110, and in some embodiments each of gates 110 may include an entry point that defines a passageway and separates the non-restricted access area from the restricted access area. Each of gates 110 may be communicatively coupled to a network 140 via one or more wired and/or wireless connections. Transit system 100 may also include a transit server 142 and a central data store 144, each of which being communicatively coupled to network 140. Transit server 142 may include a single or multiple processors, and may write, retrieve, or store data to central data store 144 or any of gates 110. Although embodiments herein are described in reference to transit systems, the restricted access area may correspond to an entertainment venue, a building, or any location involving metered access.

Figure 2:
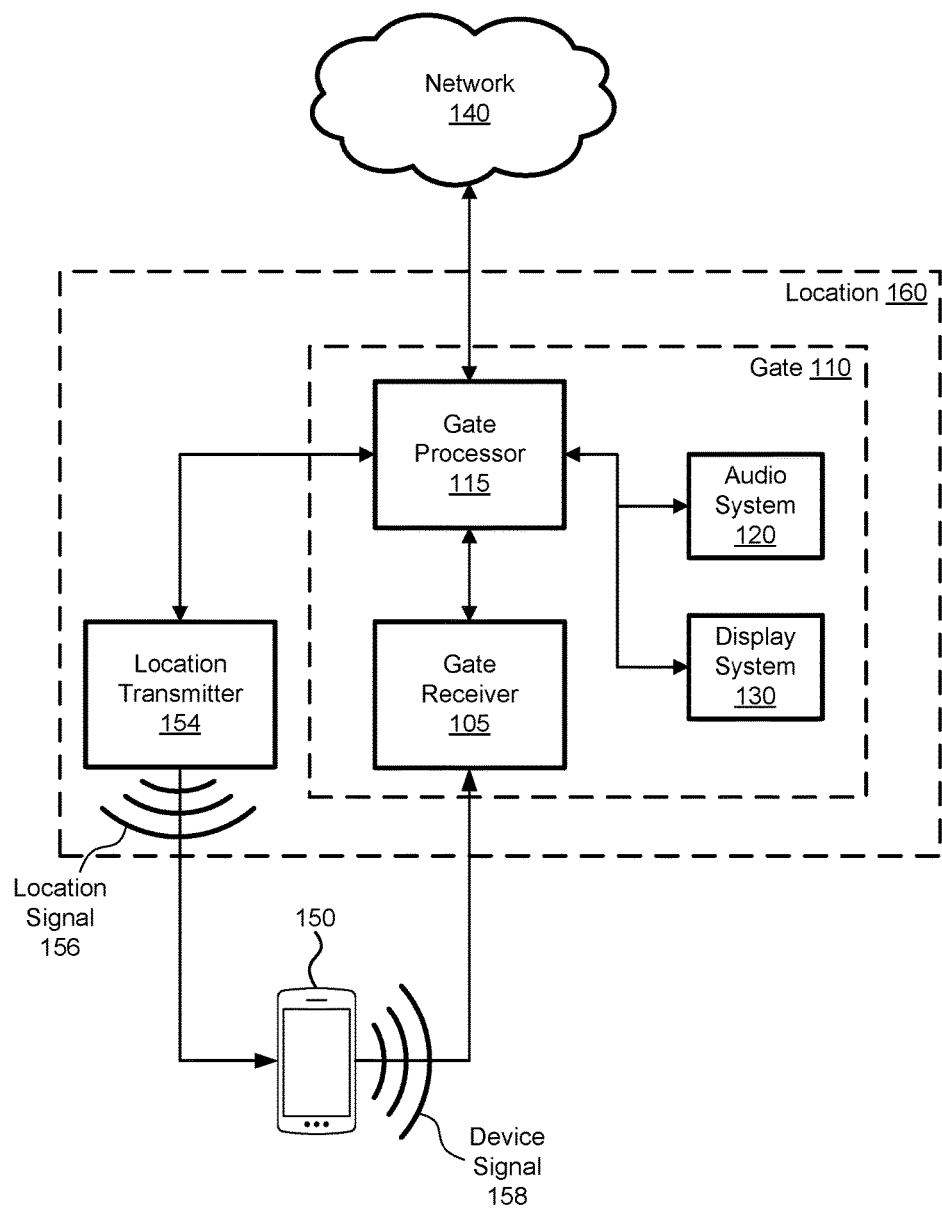
FIG. 2 illustrates a block diagram of a mobile communication device 150 in communication with various components of transit system 100, according to some embodiments of the present disclosure.

FIG. 2 illustrates a block diagram of a mobile communication device 150 in communication with various components of transit system 100, according to some embodiments of the present disclosure. A holder of mobile communication device 150 may be a customer or a potential customer of transit system 100 and may be inside or outside location 160 while mobile communication device 150 communicates with the various components of transit system 100. For example, the holder of mobile communication device 150 may be inside or outside location 160 when mobile communication device 150 receives a location signal 156 from a location transmitter 154 positioned within location 160. As another example, mobile communication device 150 may be inside or outside location 160 when a device signal 158 is transmitted by mobile communication device 150 and is received by gate receiver 105.

Gate 110 may be used as an entry point into transit system 100 (i.e., a restricted access area of transit system 100). One of ordinary skill in the art will recognize that gate 110 can vary in appearance and functionality. In some embodiments, gate 110 includes a gate receiver 105 for wirelessly communicating with mobile communication device 150. In some embodiments, gate 110 includes an audio system 120 for giving verbal instructions on using any of the components of gate 110 and a display system 130 for displaying instructions. In some embodiments, gate 110 includes a gate processor 115 in communication with network 140. Gate processor 115 may include a single or multiple processors and an associated memory. Gate processor 115 may communicate with display system 130 and provide the messaging presented on display system 130. Gate processor 115 can generate the messages to be displayed on display system 130 or receive the message to be displayed from any number of sources over network 140. Gate processor 115 may also communicate with audio system 120 and may generate the messages broadcast from audio system 120 or receive the message to be broadcast from any number of sources over the network 140. Gate processor 115 may communicate with gate receiver 105 and may determine if mobile communication device 150 allows passage or may send information received from mobile communication device 150 over network 140 to transit server 142 to make the determination.

In some embodiments, display system 130 may display a message for the holder of mobile communication device 150 that mobile communication device 150 is not in the correct place and can identify to the holder of mobile communication device 150 where to correctly place mobile communication device 150 to allow proper communication. In other embodiments display system 130 can display any manner of other messages including instructions for using gate 110, instructions for using transit system 100, and advertising. In some embodiments, gate 110 may include a media reader that requires contact with the object to be read. One of skill in the art will recognize that barriers associated with gate 110 would open up to allow the holder of mobile communication device 150 passage upon a successful communication between gate receiver 105 and mobile communication device 150.

Communication between gate receiver 105 and mobile communication device 150 may include any communication technology employing electromagnetic wireless signals. For example, the two devices may communicate using near-field communication (NFC), BLE, radio-frequency identification (RFID), and the like. In some embodiments, gate receiver 105 may include an RFID reader and mobile communication device 150 may include an RFID tag. The RFID tag may be may be passive, active, or battery-assisted passive. Active RFID tags have on-board batteries and periodically or constantly transmit wireless signals with identifying information. Battery-assisted passive RFID tags have small batteries on board and are activated when they are near an RFID reader. Passive RFID tags lack on-board batteries and are instead energized by the wireless signals received from RFID readers. RFID tags may have individual serial numbers or IDs that allow each individual RFID tag to be identified from among a larger group. In some embodiments, an RFID tag may be a credit card sized carrier or a key fob. RFID tags may operate in a 13.56 MHz band (HF), a 900 MHz band (UHF), or a 2.4 GHz band, among others. In some embodiments, UHF tags may co-exist with HF tags and vice-versa. In some embodiments, active RFID tags may be turned on and off by a user pressing a button on or near the RFID tag. For example, a wheelchair user may press a button fixed to their wheelchair to power an active RFID tag. Such embodiments may save power and preserve battery life.

Mobile communication device 150 may include (directly or indirectly via e.g., information linking to an external location) an amount of units which may be used to access transit system 100. For example, passage through different routes within transit system 100 may cause different amounts of units to be deleted from mobile communication device 150 (or from the external location). In some embodiments, transit server 142 or some external processor may cause some portion of the amount of units to be held as unavailable. When a portion of units is held as unavailable, that portion may not be used for other purposes outside transit system 100 such that the portion is locked from usage. In one particular implementation, the amount of units may correspond to money (e.g., a cash amount) usable for financial transactions such as purchase of a fare within transit system 100. In various embodiments, mobile communication device 150 may be a handheld electronic device such as a smart phone, a personal digital assistant (PDA), a tablet, a credit card or debit card issued by an entity outside transit system 100, a fare media issued by transit system 100, and the like. For example, in some embodiments mobile communication device 150 may be any type of payment card (e.g., credit card, debit card, etc.).

In some embodiments, location transmitter 154 includes an omni-directional antenna configured to repeatedly transmit location signal 156 throughout at least a portion of location 160. Location transmitter 154 may employ any one of various communication technologies including NFC, BLE, RFID, and the like. Location transmitter 154 may be directly coupled to gate processor 115 via a wired and/or wireless connection (as shown in FIG. 2). Additionally or alternatively, location transmitter 154 may be directly coupled to gate receiver 105 via a wired and/or wireless connection.

Figure 3A:
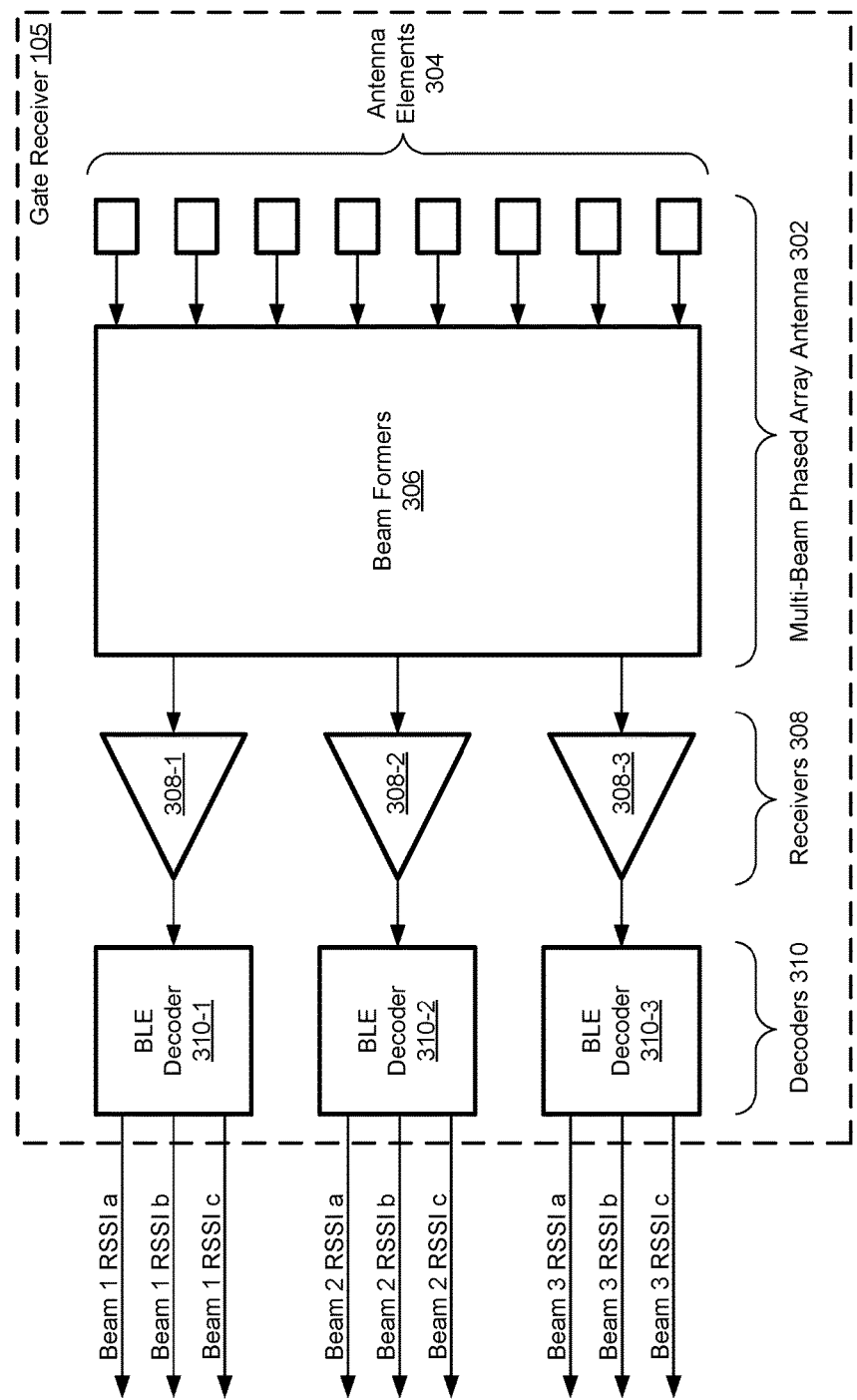
FIGS. 3A and 3B illustrate a block diagrams of gate receiver 105, according to some embodiments of the present disclosure.
Figure 3B:
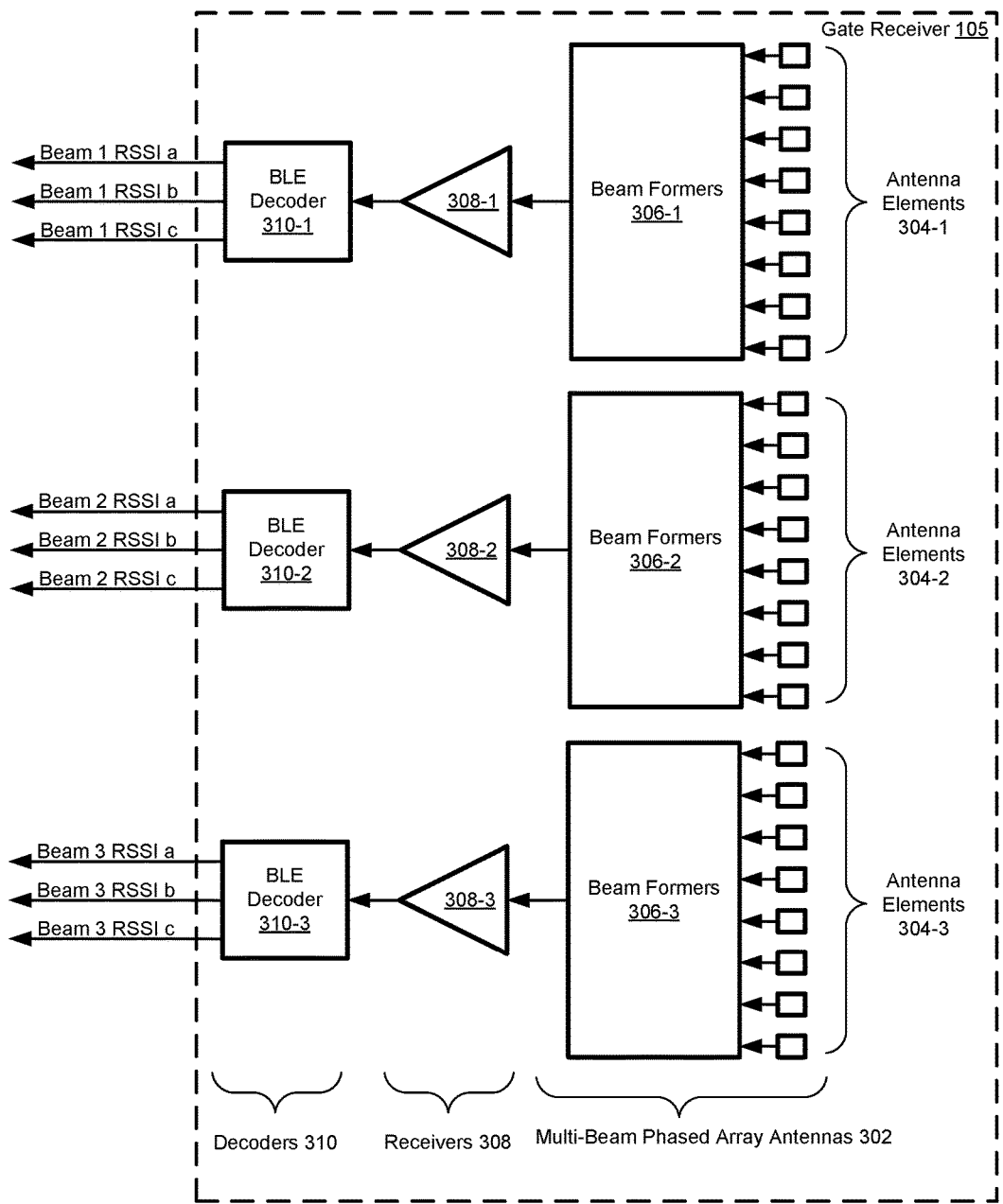

FIGS. 3A and 3B illustrate a block diagrams of gate receiver 105, according to some embodiments of the present disclosure. In reference to FIG. 3A, gate receiver 105 may include a multi-beam phased array antenna 302 comprising a plurality of antenna elements 304 and beam formers 306 (i.e., beam forming networks). Antenna elements 304 may be arranged in a side-by-side configuration which may include, in some embodiments, forming a line that is substantially parallel to a direction the transit user is traveling, forming a semi-circle which is substantially evenly offset from the path the transit user is traveling, and the like. Arranging antenna elements 304 in a side-by-side configuration may also include arranging antenna elements 304 such that they are offset from the path the transit user is traveling by varying distances. Other possibilities are contemplated.

Beam formers 306 in combination with antenna elements 304 can electrically steer a radiation pattern (i.e., beam) by manipulating the phase of the signals received through antenna elements 304. In some embodiments, beam formers 306 include three beam forming networks forming three beams pointing in different directions. Each of the beam forming networks may adjust the beam angle by controlling the delay in each output port using trace length. In one particular implementation, multi-beam phased array antenna 302 is linearly phased with eight antenna elements 304 positioned along a straight line configured to receive wireless signals at Bluetooth frequencies (ISM 2.4 GHz to 2.48 GHz). The three beam forming networks may be configured to produce three simultaneous fan beams pointing in three directions, such as 10 degrees, 30 degrees, and 55 degrees. In another particular implementation using weighted elements for sidelobe suppression, elements 1 and 8 of antenna elements 304 are attenuated by 6 dB and elements 2 and 7 are attenuated by 3 dB.

Gate receiver 105 may optionally include three receivers 308 coupled to beam formers 306 for converting the received signals into digital samples. Each of receivers 308 may include one or more amplifiers, mixers, band-pass filters, and analog-to-digital converters. Gate receiver 105 may also include three BLE decoders 310 coupled to receivers 308 (or beam formers 306) for generating RSSI's corresponding to the received signals. In some embodiments, the RSSI is calculated for each of three different advertising channels (channels a, b, and c) and for each of the three beams (beams 1, 2, and 3) such that nine RSSI's are generated at a time. The separate averaging of the three advertising channels can be based on the receiver's knowledge about which channel device signal 158 was received on. Also, the channel may be indicated in the payload of device signal 158 when it is transmitted by mobile communication device 150. Furthermore, the knowledge that device signal 158 may be repeatedly transmitted in a fixed pattern, one channel after another, with a fixed spacing (e.g., 100 ms) and a fixed ordering could be used. The RSSI's may be calculated as a function of time (e.g., at a frequency of ten times per second) and either outputted to gate processor 115 to be analyzed by gate processor 115, or analyzed by one or more processors within gate receiver 105.

FIG. 3B illustrates an embodiment in which three separate multi-beam phased array antennas 302 are utilized, each with a different set of antenna elements 304, instead of a single multi-beam phased array antenna 302 as described in reference to FIG. 3A. Each of the three antenna sets has separate beam formers 306 and is connected to a single receiver 308. One advantage of the embodiment shown in FIG. 3B is that three relatively inexpensive antennas may be used.

Figure 4:
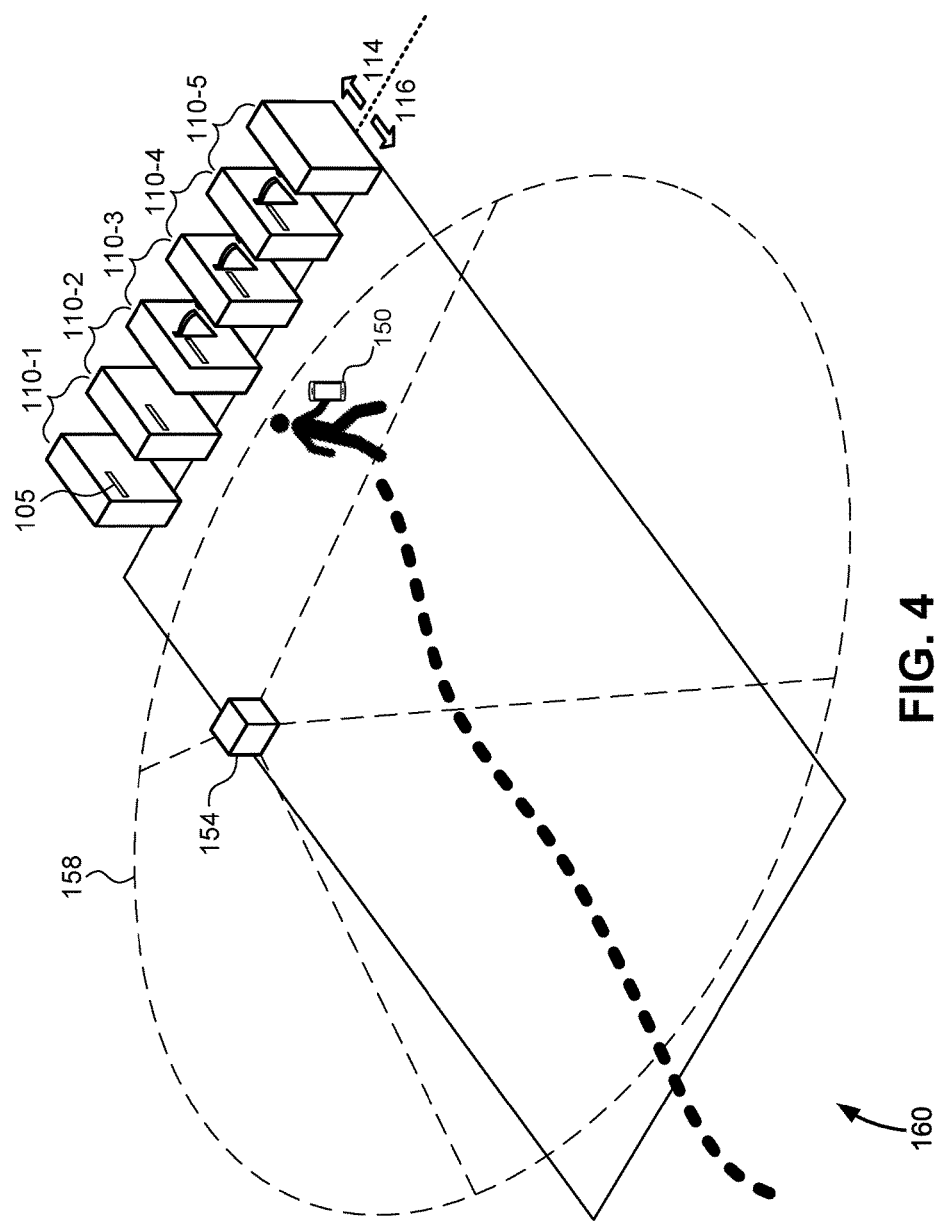
FIG. 4 illustrates an example of transit location 160 being a train or bus station, according to some embodiments of the present disclosure.

FIG. 4 illustrates an example of transit location 160 being a train or bus station, according to some embodiments of the present disclosure. Transit location 160 shown in FIG. 4 includes a plurality of gates 110 separating a restricted access area 114 from a non-restricted access area 116. One or more of gates 110 may be barrierless (i.e., "gateless") (e.g., gates 110-1 and 110-2) and one or more of gates 110 may include barriers (e.g., gates 110-3, 110-4, and 110-5). Each of gates 110 may include gate receiver 105 positioned along one or both sides of the passageways formed by each of gates 110. In some embodiments, location transmitter 154 is mounted to an elevated position within transit location 160 such that a corresponding coverage zone 158 covers at least part of transit location 160 such that a holder of mobile communication device 150 necessarily passes through coverage zone 158 while navigating towards gates 110.

Figure 5:
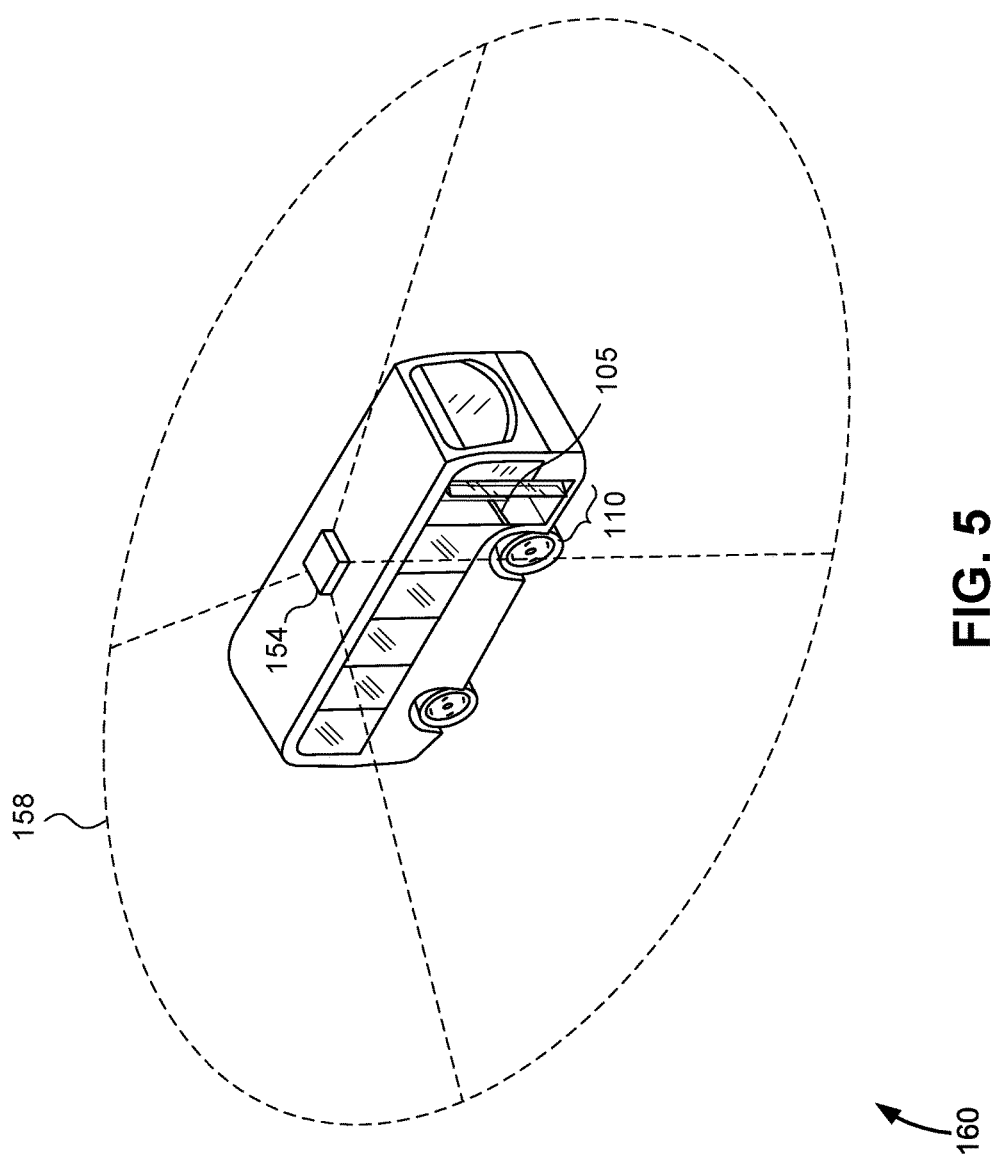
FIG. 5 illustrates an example of transit location 160 being a bus, according to some embodiments of the present disclosure.

FIG. 5 illustrates an example of transit location 160 being a bus, according to some embodiments of the present disclosure. Transit location 160 as shown in FIG. 5 includes gate 110 being the entrance into the bus separating the restricted access area (inside the bus) from the non-restricted access area (outside the bus). Gate 110 includes gate receiver 105 positioned along one or both sides of the passageway formed by gate 110. Location transmitter 154 may be mounted to a roof, ceiling, or elsewhere within the bus such that coverage zone 158 covers the entire inside of the bus and a portion of the surroundings of the bus.

Figure 6:
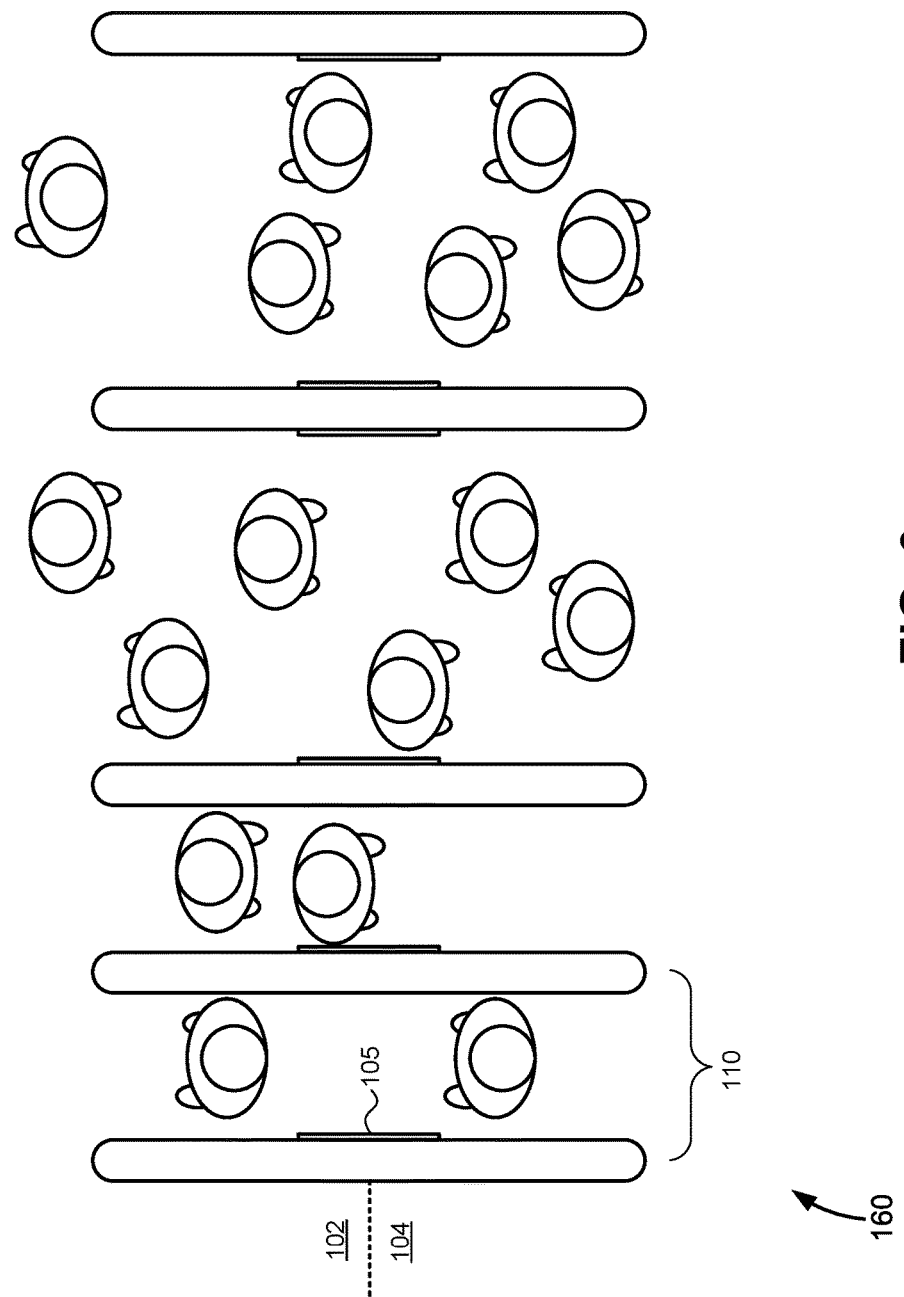
FIG. 6 illustrates a top view of an example of transit location 160, according to some embodiments of the present disclosure.

FIG. 6 illustrates a top view of an example of transit location 160, according to some embodiments of the present disclosure. In some embodiments, gate receiver 105 is positioned on a single gate cabinet of gate 110, while in other embodiments a first gate receiver 105 is positioned on a first gate cabinet of gate 110 and a second gate receiver 105 is positioned on a second gate cabinet of gate 110. Gate 105 may form a sufficiently large passageway to accommodate transit users both entering and exiting the restricted access area 102.

Figure 7:
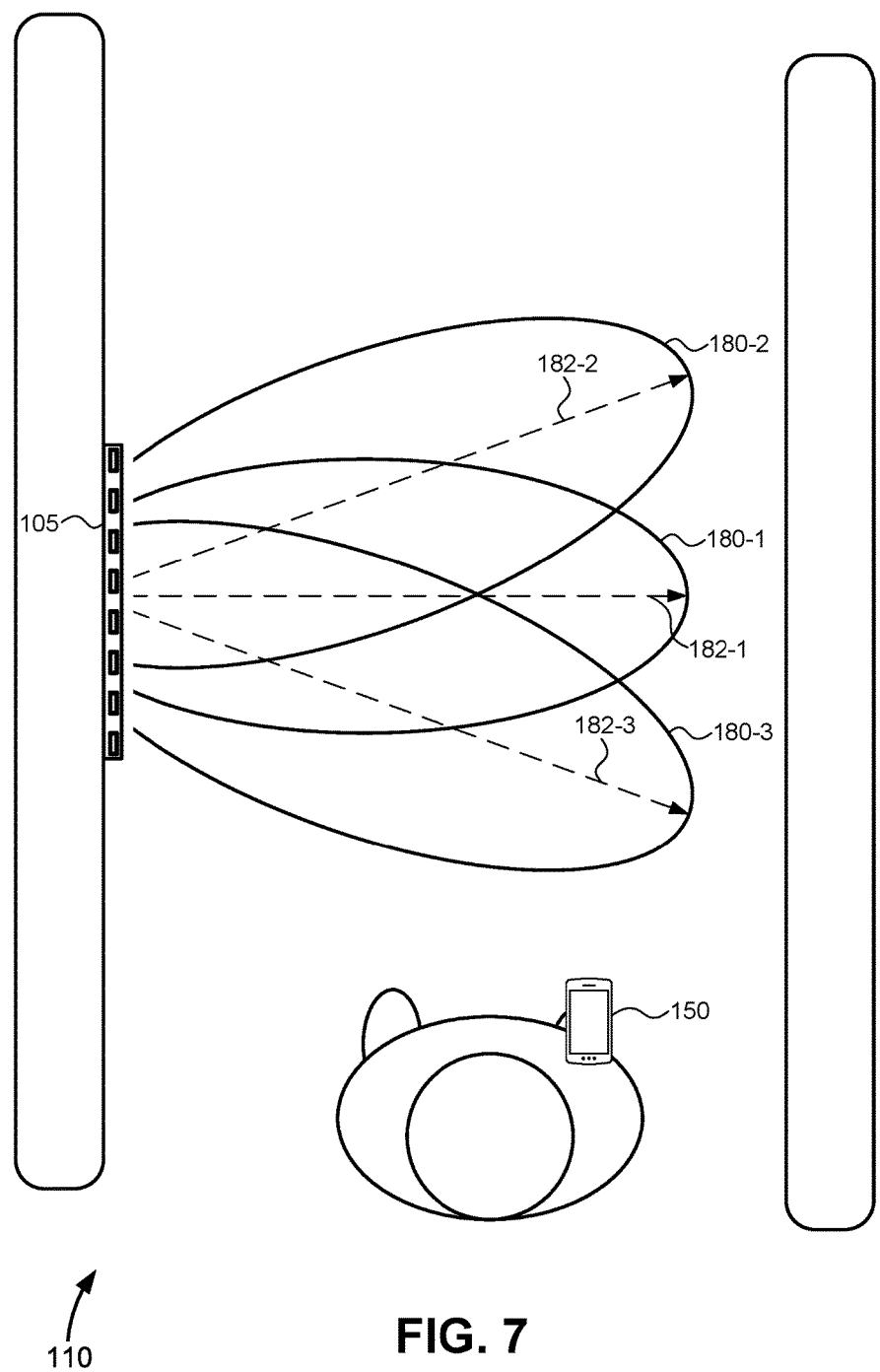
FIG. 7 illustrates a top view of an example of gate 110, according to some embodiments of the present disclosure.

FIG. 7 illustrates a top view of an example of gate 110, according to some embodiments of the present disclosure. In some embodiments, beam formers 306 and antenna elements 304 can form three beams 180 pointing in three directions 182. Beams 180 may partially overlap and may cover different volumes separated in the direction parallel to the passageway formed by gate 110 (the direction the holder of wireless communication device 150 is moving). In some embodiments, a first direction 182-1 may be perpendicular to the passageway and a second and third direction 182-2 and 182-3 may form an identical but opposite angle with respect to the first direction 182-1.

Figure 8:
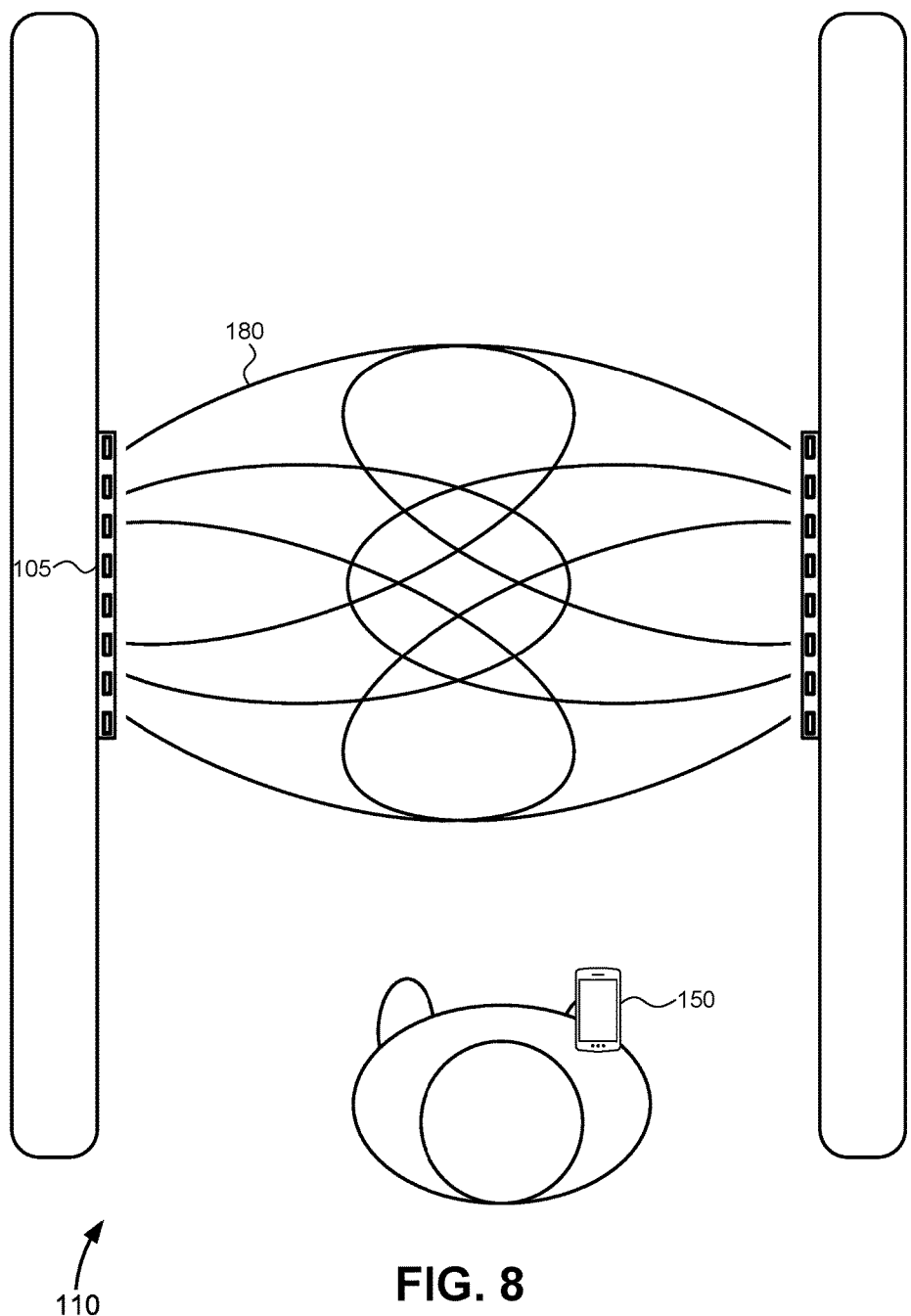
FIG. 8 illustrates a top view of an example of gate 110, according to some embodiments of the present disclosure.

FIG. 8 illustrates a top view of an example of gate 110, according to some embodiments of the present disclosure. In some embodiments, beams 180 may be formed by both a left and a right gate receiver 105.

Figure 9:
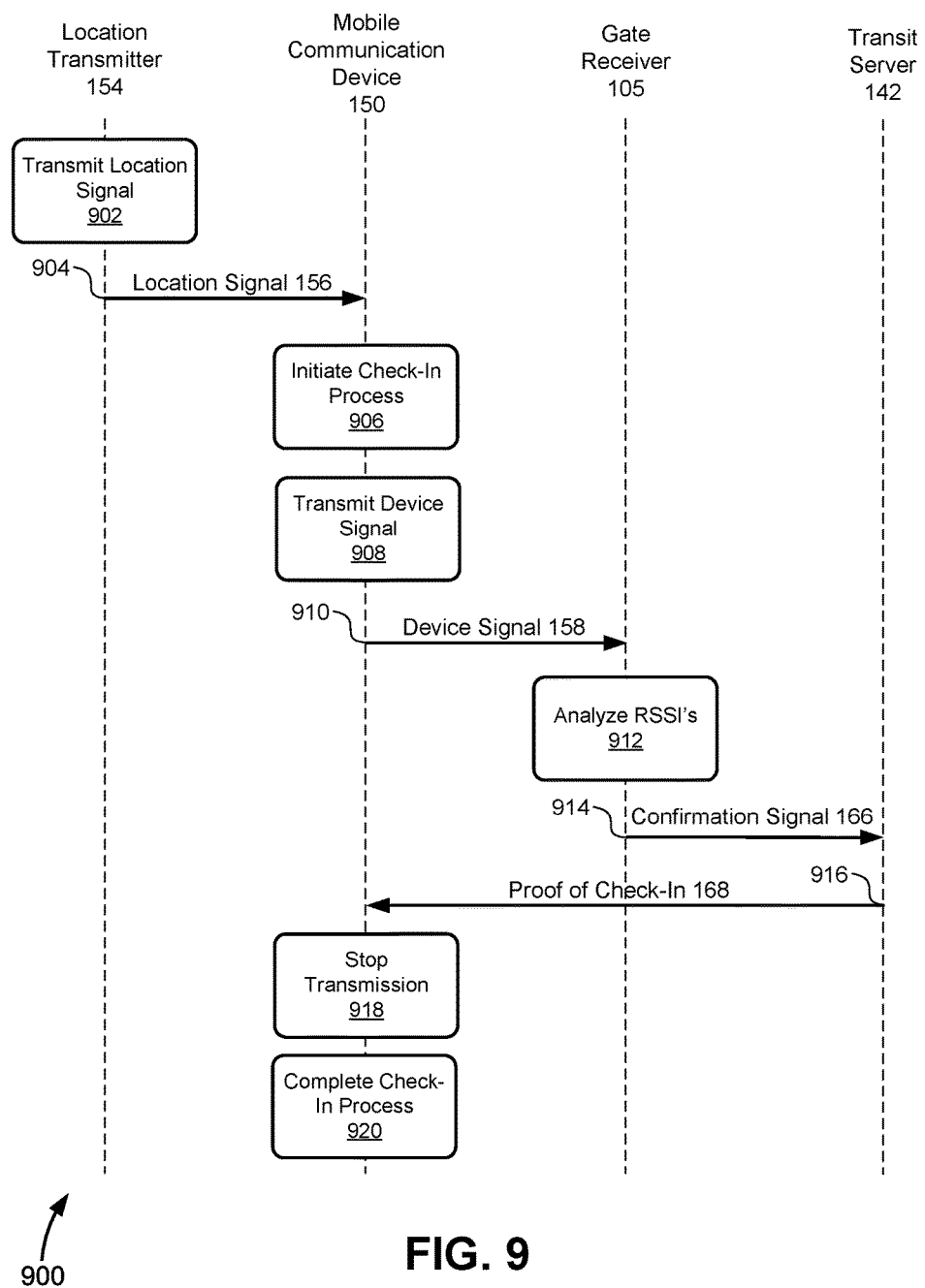
FIG. 9 illustrates a method 900 of using wireless RF signals for enabling transit access, according to some embodiments of the present disclosure.

FIG. 9 illustrates a method 900 of using wireless RF signals for enabling transit access, according to some embodiments of the present disclosure. Specifically, method 900 enables a check-in of a transit user using mobile communication device 150. Steps of method 900 need not be performed in the order shown, and one or more steps may be omitted during performance of method 900.

At step 902, location signal 156 is repeatedly transmitted by location transmitter 154. In this manner, location transmitter 154 acts like a beacon detectable by mobile communication device 150. Location signal 156 may identify transit location 160, identify transit system 100, provide instructions for entering gate 110, provide alerts about delays within transit system 100, and the like. Repeatedly transmitting location signal 156 may include periodically transmitting, continuously or semi-continuously transmitting, or intermittently transmitting location signal 156. Each transmitted location signal 156 may be identical or nearly identical (differing only with respect to a time stamp included in location signal 156). In some embodiments, repeatedly transmitting location signal 156 may include transmitting location signal 156 two or more times.

At step 904, location signal 156 is transmitted by location transmitter 154 and is received by mobile communication device 150.

At step 906, a check-in process is initiated by mobile communication device 150 in response to receiving location signal 156. In some embodiments, initiating the check-in process may cause mobile communication device 150 to enter a check-in state in which it begins to transmit device signal 158 at a particular rate (e.g., 10 Hz) and checks for additional received location signals 156 at a higher rate. In some embodiments, initiating the check-in process causes mobile communication device 150 to open an application associated with access to transit system 100. In some embodiments, initiating the check-in process causes mobile communication device 150 to hold a balance (e.g., cash balance) on an account associated with mobile communication device 150 as unavailable. For example, based on transit location 160 identified in location signal 156, a maximum balance associated with mobile communication device 150 may be held as unavailable. In some embodiments, it may be determined whether the balance associated with mobile communication device 150 is sufficient for accessing transit system 100 at transit location 160 (e.g., whether the balance exceeds a minimum fare amount based on transit location 160).

At step 908, device signal 158 is repeatedly transmitted by mobile communication device 150. In this manner, mobile communication device 150 acts like a beacon detectable by gate receiver 105. Device signal 158 may identify mobile communication device 150 and/or the holder of mobile communication device 150. In some embodiments, device signal 158 is not an information containing signal but is an excitation signal at a particular target frequency. Repeatedly transmitting device signal 158 may include periodically transmitting, continuously or semi-continuously transmitting, or intermittently transmitting device signal 158. Each transmitted device signal 158 may be identical or nearly identical (differing only with respect to a time stamp included in device signal 158).

At step 910, device signal 158 is transmitted by mobile communication device 150 and is received by gate receiver 105. After receiving one or more device signals 158, gate receiver 105 (specifically decoders 310) may generate RSSI's corresponding to the received device signal 158.

At step 912, the RSSI's are analyzed to determine whether the holder of mobile communication device 150 is entering through gate 110. In one particular implementation, determining that the holder of mobile communication device 150 is entering through gate 110 includes determining that a first maximum of a first RSSI corresponding to beam 180-1 is greater than a predetermined threshold, determining that a second maximum of a second RSSI corresponding to beam 180-2 is greater than the predetermined threshold, and determining that a first time associated with the first maximum is less than (i.e., earlier than) a second time associate with the second maximum. In some embodiments, the determination that the holder of mobile communication device 150 is entering through gate 110 may only include determining that the first time is less than the second time. In some embodiments, the determination may be based on RSSI's corresponding to each of beams 180 and each of the advertising channels. In some embodiments, each of the RSSI's corresponding to each of beams 180 is compared to the mean value of the RSSI's. In such embodiments, determining that the holder of mobile communication device 150 is entering through gate 110 may include sequentially determining that, first, a first RSSI corresponding to beam 180-3 exceeds the mean value, followed by a second RSSI corresponding to beam 180-1 exceeding the mean value, followed by a third RSSI corresponding to beam 180-2 exceeding the mean value. Other possibilities are contemplated At step 914, a confirmation signal 166 is transmitted by gate receiver 105 and is received by transit server 142. Confirmation signal 166 may identify mobile communication device 150 and/or the holder of mobile communication device 150, a time stamp indicating the time at which it was determined that the holder of mobile communication device 150 is entering through gate 110, the transit location 160, and the like. In response to receiving confirmation signal 166, transit server 142 may register the check-in process by storing the data received from gate 110 within central data store 144.

At step 916, a proof of check-in 168 is transmitted by transit server 142 and is received by mobile communication device 150. Proof of check-in 168 may be a code or image that may be displayed on mobile communication device 150 to notify transit employees that the holder of mobile communication device 150 is authorized to access transit system 100.

At step 918, mobile communication device 150 may stop transmission of device signal 158 in response to receiving proof of check-in 168.

At step 920, mobile communication device 150 may complete the check-in process in response to receiving proof of check-in 168. Completing the check-in process may include sending and/or storing an indication that the holder of mobile communication device 150 has entered gate 110 or an indication that the holder of mobile communication device 150 is currently within the restricted access area at transit location 160. In some embodiments, completing the check-in process may include causing mobile communication device 150 to stop transmission of device signal 158 (i.e., performance of step 918). In some embodiments, completing the check-in process includes sending a payment or holding a fare as unavailable on an account associated with mobile communication device 150.

Figure 10:
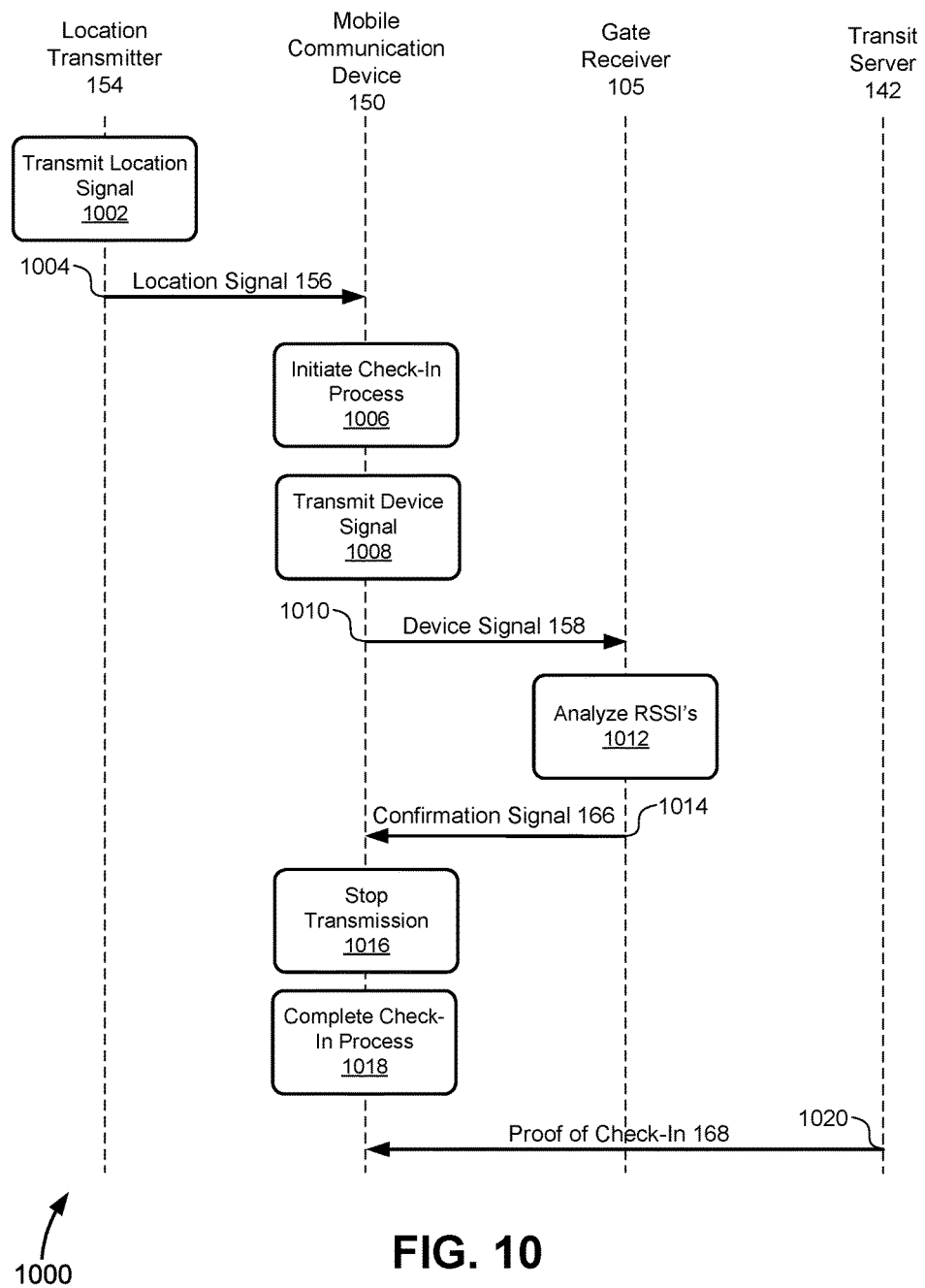
FIG. 10 illustrates a method 1000 of using wireless RF signals for enabling transit access, according to some embodiments of the present disclosure.

FIG. 10 illustrates a method 1000 of using wireless RF signals for enabling transit access, according to some embodiments of the present disclosure. Specifically, method 1000 enables a check-in of a transit user using mobile communication device 150. Steps of method 1000 need not be performed in the order shown, and one or more steps may be omitted during performance of method 1000. In some embodiments, one or more of steps 1002-1012 may correspond to one or more of steps 902-912 described in reference to FIG. 9.

At step 1014, confirmation signal 166 is transmitted by gate receiver 105 and is received by transit server 142. Confirmation signal 166 may indicate that the holder of mobile communication device 150 was determined to have entered through gate 110 and the time stamp associated with the determination.

At step 1016, mobile communication device 150 may stop transmission of device signal 158 in response to receiving confirmation signal 166.

At step 1018, mobile communication device 150 may complete the check-in process in response to receiving confirmation signal 166. Completing the check-in process may include sending an indication that the holder of mobile communication device 150 has entered gate 110 to transit server 142. In some embodiments, completing the check-in process may include causing mobile communication device 150 to stop transmission of device signal 158 (i.e., performance of step 1016). In some embodiments, completing the check-in process includes sending a payment or holding a fare as unavailable on an account associated with mobile communication device 150.

At step 1020, proof of check-in 168 is transmitted by transit server 142 and is received by mobile communication device 150. Proof of check-in 168 may be a code or image that may be displayed on mobile communication device 150 to notify transit employees that the holder of mobile communication device 150 is authorized to access transit system 100.

Figure 11:
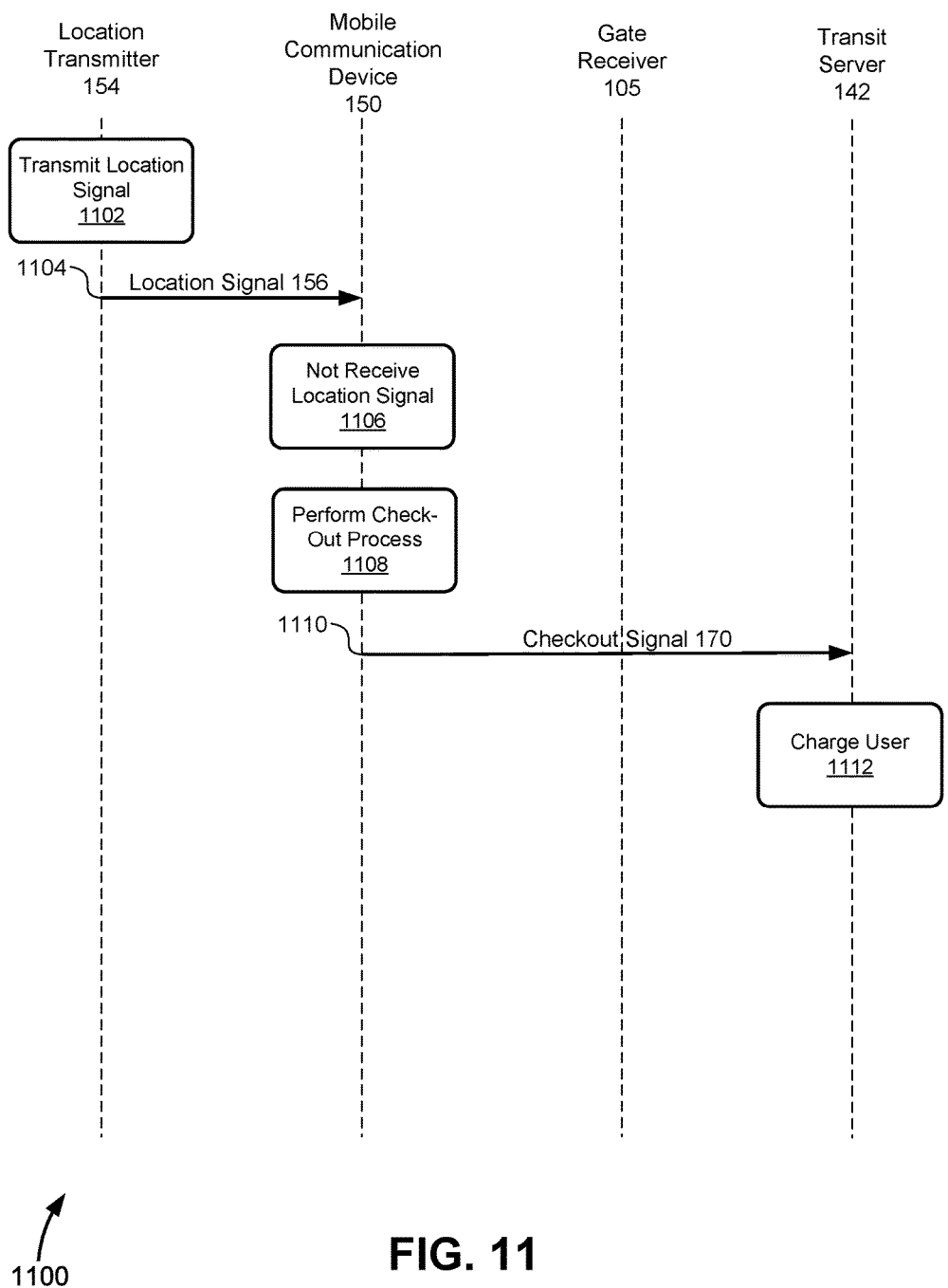
FIG. 11 illustrates a method 1100 of using wireless RF signals for enabling transit access, according to some embodiments of the present disclosure.

FIG. 11 illustrates a method 1100 of using wireless RF signals for enabling transit access, according to some embodiments of the present disclosure. Specifically, method 1100 enables a check-out of a transit user using mobile communication device 150. In some instances, method 1100 may be performed when transit location 160 corresponds to a bus or train and location transmitter 154 is mounted onto the bus or train (as described in reference to FIG. 5). Steps of method 1100 need not be performed in the order shown, and one or more steps may be omitted during performance of method 1100.

At step 1102, location signal 156 is repeatedly transmitted by location transmitter 154. Step 1102 may correspond to step 902 described in reference to FIG. 9.

At step 1104, location signal 156 and is repeatedly received by mobile communication device 150. Repeatedly receiving location signal 156 may include periodically receiving, continuously or semi-continuously receiving, or intermittently receiving location signal 156.

At step 1106, it is determined that location signal 156 has not been received by mobile communication device 150 for a threshold amount of time. In some embodiments, the threshold amount of time may be 1 second, 5 seconds, 10 seconds, 30 seconds, and the like.

At step 1108, a check-out process is performed by mobile communication device 150. In some embodiments, performing the check-out process includes causing mobile communication device 150 to stop receiving or stop attempting to receive location signal 156. In some embodiments, performing the check-out process includes determining an exit transit location 160 and calculating a fare based on the entry transit location 160 and the exit transit location 160. In some embodiments, performing the check-out process includes holding the fare as unavailable on an account associated with mobile communication device 150.

At step 1110, a check-out signal 170 is transmitted by mobile communication device 150 and is received by transit server 142. Check-out signal 170 may identify mobile communication device 150 and/or the holder of mobile communication device 150, a time stamp indicating the time at which mobile communication device 150 performed the check-out process, an entry transit location 160, an exit transit location 160, and the like.

At step 1112, the holder of mobile communication device 150 is charged the fare amount and/or it is determined that the holder of mobile communication device 150 was previously charged the fare amount.

Figure 12:
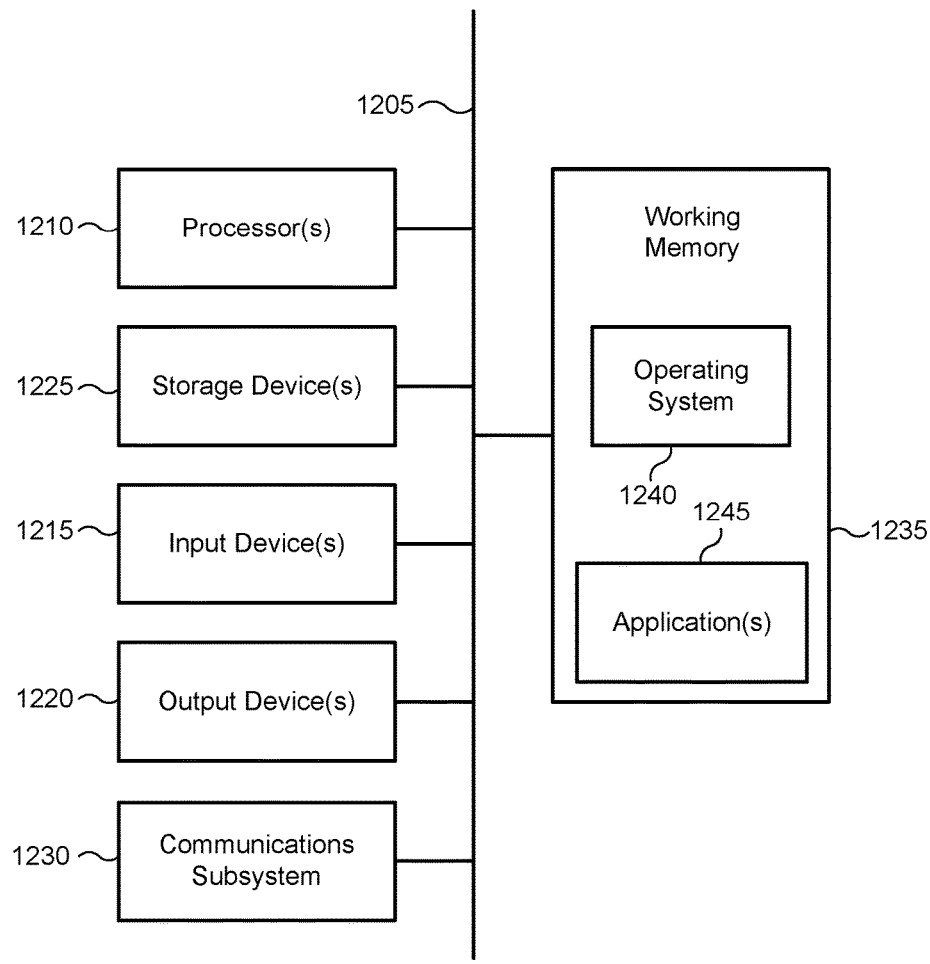
FIG. 12 illustrates a simplified computer system, according to some embodiments of the present disclosure.

FIG. 12 illustrates a simplified computer system, according to some embodiments of the present disclosure. A computer system 1200 as illustrated in FIG. 12 may be incorporated into devices such as location transmitter 154, mobile communication device 150, gate receiver 105, and transit server 142 as described herein. FIG. 12 provides a schematic illustration of one embodiment of a computer system 1200 that can perform some or all of the steps of the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205, or may otherwise be in communication, as appropriate. The hardware elements may include one or more processors 1210, including without limitation one or more general-purpose processors and/or one or more special-purpose processors such as digital signal processing chips, graphics acceleration processors, and/or the like; one or more input devices 1215, which can include without limitation a mouse, a keyboard, a camera, and/or the like; and one or more output devices 1220, which can include without limitation a display device, a printer, and/or the like.

The computer system 1200 may further include and/or be in communication with one or more non-transitory storage devices 1225, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1200 might also include a communications subsystem 1230, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1230 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1230. In other embodiments, a portable electronic device, e.g. the first electronic device, may be incorporated into the computer system 1200, e.g., an electronic device as an input device 1215. In some embodiments, the computer system 1200 will further comprise a working memory 1235, which can include a RAM or ROM device, as described above.

The computer system 1200 also can include software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 12, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1225 described above. In some cases, the storage medium might be incorporated within a computer system, such as computer system 1200. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1200 to perform methods in accordance with various embodiments of the technology. According to a set of embodiments, some or all of the procedures of such methods are performed by the computer system 1200 in response to processor 1210 executing one or more sequences of one or more instructions, which might be incorporated into the operating system 1240 and/or other code, such as an application program 1245, contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200.

The communications subsystem 1230 and/or components thereof generally will receive signals, and the bus 1205 then might carry the signals and/or the data, instructions, etc. carried by the signals to the working memory 1235, from which the processor(s) 1210 retrieves and executes the instructions. The instructions received by the working memory 1235 may optionally be stored on a non-transitory storage device 1225 either before or after execution by the processor(s) 1210.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method of using a multi-beam phased array antenna for enabling transit access, the method comprising:
  repeatedly transmitting, by a location transmitter positioned within a transit location within a transit system, a location signal identifying the transit location;
  receiving, by a mobile communication device, the location signal;
  in response to receiving the location signal:
    initiating, by the mobile communication device, a check-in process; and
    transmitting, by the mobile communication device, a device signal identifying the mobile communication device;
  receiving, by a gate receiver positioned within a gate within the transit location, the device signal, wherein the gate receiver includes the multi-beam phased array antenna;
  analyzing, by the gate receiver, at least two received signal strength indicators (RSSI) corresponding to the received device signal to determine that a holder of the mobile communication device is entering through the gate; and causing, by the mobile communication device, a completion of the check-in process.

2. The method of claim 1, wherein the gate receiver comprises:
the multi-beam phased array antenna comprising:
a plurality of antenna elements arranged in a side-by-side configuration; and
at least two beam forming networks coupled to the plurality of antenna elements configured to produce at least two fan beams pointing in at least two directions; and
at least two decoders coupled to the at least two beam forming networks for generating the at least two RSSIs.

3. A method of using wireless radio-frequency (RF) signals for enabling transit access, the method comprising:
receiving, by a mobile communication device from a location transmitter positioned within a transit location within a transit system, a location signal identifying the transit location, wherein the location signal is repeatedly transmitted by the location transmitter;
in response to receiving the location signal:
initiating, by the mobile communication device, a check-in process; and
repeatedly transmitting, by the mobile communication device, a device signal identifying the mobile communication device; and
causing a completion of the check-in process in response to the device signal being received by a gate receiver, wherein the gate receiver is positioned within a gate within the transit location, and wherein the received device signal is analyzed to determined that a holder of the mobile communication device is entering through the gate.

4. The method of claim 3, wherein the location transmitter includes an omni-directional antenna.

5. The method of claim 3, wherein the gate receiver comprises:
a multi-beam phased array antenna comprising:
a plurality of antenna elements arranged in a side-by-side configuration; and
at least two beam forming networks coupled to the plurality of antenna elements configured to produce at least two fan beams pointing in at least two directions; and
at least two decoders coupled to the at least two beam forming networks for generating at least two received signal-strength indicators (RSSI) corresponding to the received device signal.

6. The method of claim 5, wherein analyzing the received device signal to determine that the holder of the mobile communication device is entering through the gate includes:
determining that a first maximum of a first RSSI of the at least two RSSIs is greater than a predetermined threshold;
determining that a second maximum of a second RSSI of the at least two RSSIs is greater than the predetermined threshold; and
determining whether a first time associated with the first maximum is greater or less than a second time associated with the second maximum.

7. The method of claim 3, wherein initiating, by the mobile communication device, the check-in process includes opening an application associated with the transit access on the mobile communication device.

8. The method of claim 3, wherein initiating, by the mobile communication device, the check-in process includes holding an amount as unavailable on an account associated with the mobile communication device.

9. The method of claim 3, wherein transmitting the device signal identifying the mobile communication device includes repeatedly transmitting the device signal identifying the mobile communication device.

10. The method of claim 9, wherein causing the completion of the check-in process includes:
causing the mobile communication device to stop transmitting the device signal; and
repeatedly receiving, by the mobile communication device, the location signal.

11. The method of claim 9, wherein communication between the location transmitter, the mobile communication device, and the gate receiver utilizes Bluetooth Low Energy (BLE).

12. A gate receiver for enabling transit access using wireless RF signals, the gate receiver comprising:
an antenna;
one or more processors communicatively coupled to the antenna, wherein the one or more processors are configured to perform operations including:
receiving, using the antenna, a device signal identifying a mobile communication device, wherein:
the device signal is repeatedly transmitted by the mobile communication device in response to the mobile communication device receiving a location signal from a location transmitter positioned within a transit location within a transit system;
the location signal identifies the transit location and is repeatedly transmitted by the location transmitter; and
the mobile communication device initiates a check-in process in response to receiving the location signal;
analyzing the received device signal to determine that a holder of the mobile communication device is entering through a gate including the gate receiver; and
causing a completion of the check-in process.

13. The gate receiver of claim 12, wherein the location transmitter includes an omni-directional antenna.

14. The gate receiver of claim 12, wherein:
the antenna is a multi-beam phased array antenna comprising:
a plurality of antenna elements arranged in a side-by-side configuration; and
at least two beam forming networks coupled to the plurality of antenna elements configured to produce at least two fan beams pointing in at least two directions; and
the gate receiver further comprises at least two decoders coupled to the at least two beam forming networks for generating at least two received signal-strength indicators (RSSI) corresponding to the received device signal.

15. The gate receiver of claim 14, wherein analyzing the received device signal to determine that the holder of the mobile communication device is entering through the gate includes:
determining that a first maximum of a first RSSI of the at least two RSSIs is greater than a predetermined threshold;

determining that a second maximum of a second RSSI of the at least two RSSIs is greater than the predetermined threshold; and determining whether a first time associated with the first maximum is greater or less than a second time associated with the second maximum.

16. The gate receiver of claim 12, wherein initiating, by the mobile communication device, the check-in process includes opening an application associated with the transit access on the mobile communication device.

17. The gate receiver of claim 12, wherein initiating, by the mobile communication device, the check-in process includes holding an amount as unavailable on an account associated with the mobile communication device.

18. The gate receiver of claim 12, wherein transmitting the device signal identifying the mobile communication device includes repeatedly transmitting the device signal identifying the mobile communication device.

19. The gate receiver of claim 18, wherein causing the completion of the check-in process includes:

causing the mobile communication device to stop transmitting the device signal; and repeatedly receiving, by the mobile communication device, the location signal.

20. The gate receiver of claim 18, wherein communication between the location transmitter, the mobile communication device, and the gate receiver utilizes Bluetooth Low Energy (BLE).

* * * * *